United States Patent [19]
Anderson

[11] Patent Number: 5,617,622
[45] Date of Patent: Apr. 8, 1997

[54] ROTATABLE WORK PLATFORM WITH CLAMPS FOR WALL AND TRUSS FABRICATION

[76] Inventor: Tommy G. Anderson, 2084 Fancy Oak #1, Redding, Calif. 96003

[21] Appl. No.: 467,570

[22] Filed: Jun. 6, 1995

[51] Int. Cl.⁶ .................................................. B23P 19/00
[52] U.S. Cl. ..................... 29/281.3; 29/281.4; 29/281.5; 269/37; 269/71; 269/910
[58] Field of Search ..................... 269/307, 910, 269/303–305, 315, 319, 37, 71; 100/913; 29/281.3, 281.1, 281.4, 281.5

[56] References Cited

U.S. PATENT DOCUMENTS

| | | | |
|---|---|---|---|
| 929,045 | 7/1909 | Stewart et al. | 269/910 |
| 1,834,294 | 12/1931 | Spahn | 269/71 |
| 2,938,480 | 5/1960 | Irwin | 269/910 |
| 3,851,384 | 12/1974 | Kellner et al. . | |
| 3,897,620 | 8/1975 | Wright . | |
| 4,295,269 | 10/1981 | Wright . | |
| 4,660,815 | 4/1987 | Rosser . | |
| 4,876,787 | 10/1989 | Ditty et al. . | |
| 5,350,162 | 9/1994 | Cushing | 29/281.3 |

*Primary Examiner*—Robert C. Watson

[57] ABSTRACT

A platform for indexing and clamping metal studs and like building structural members together for manufacturing metal framed walls or trusses of buildings. The platform includes spaced members for supporting studs, plates and the like placed there upon, and is sufficiently open between the spaced and properly placed members to allow applying screws to both sides of the structural members for connection of joints. The platform may be manually loaded with the appropriate framing structural members with the platform in a horizontal position with the indexing stops upward. The indexing stops are used to position studs, and powered clamps are provided to secure the studs in place against the stops. Screws may be applied to a first side of the framing, followed by the platform being rotated 180 degrees under motor or like power to expose the second side of the framing to allow the application of holding screws thereto. The indexing clamps and the movable raised plate hold the framing in place while the platform is rotated or inverted.

4 Claims, 10 Drawing Sheets

ROTATABLE WORK PLATFORM WITH CLAMPS FOR WALL AND TRUSS FABRICATION

BACKGROUND OF THE INVENTION

1. Field of the Invention

The present invention generally relates to building construction, and more particularly to an apparatus for aiding in the fabrication of metal framed walls and trusses for commercial and residential buildings.

2. Description of Prior Art

Metal framed walls and roof trusses have been in use for many years primarily in commercial buildings, and are now becoming popular for residential homes due to the increasing cost and declining quality of lumber, and also the reduced fire danger provided by metal framing. Although building metal frame sections, i.e., metal framed walls and trusses, can be manually constructed on the job site, it is somewhat difficult since both sides of the wall or truss at the top and at the bottom plates or cords must be affixed with metal holding screws on each of the oppositely disposed sides, and this involves turning the entire wall or truss over to gain access to the second side after the holding screws have been applied to the front side, and this due to the fact most walls and trusses are constructed laying flat on a flat surface. This flipping of the wall sections and trusses is time consuming and requires labor. Additionally, since the wall or truss is not completing and securely screwed together at the point in time when inverting is required to access the second side thereof, racking and flexing can occur leading to a decrease in the overall accuracy of the completed metal framed section.

The most commonly used metal building structural members, i.e., studs, cripple studs, trimmers, headers, top and bottom plates, joists, rafters, truss cords and webs and the like are most often created out of various lengths of commercially available thin C shaped metal channels (thin channel iron) normally readily available in gauges between 12 and 25 for conventional building framing, and most commonly made of galvanized or rust resistant roll-formed steel. The metal members are usually structured 1⅝ inch in width across the face, and 3⅝ inch in depth to simulate the size of a traditional planed wood 2×4 in order to be compatible with conventional building plans. Such metal building structural members are also available in sizes simulating or compatible with most nominal planed construction lumber sizes such as 2×6, 2×8, 2×10 and so on. The metal building structural members are available in many pre-cut lengths, such as 8 or 9 foot lengths for placing the members (studs) vertically for defining walls and determining ceiling heights, and in much longer lengths, such as 20 to 40 feet for use as top and bottom walls plates, floor and ceiling joists, rafters, webbings, braces and the like. Such long members are also used for unusually tall walls.

The C channel most commonly used in conventional metal framing is sufficiently flexible due to the thinness of the material to allow the full insertion of a terminal end of one member into the open "C" of a second member, wherein the narrow side walls of the two members overlap at perpendicular angles, or as is common with truss members at obtuse or acute angles, and it is at this overlap of the narrow side walls that holding screws are applied to secure the members to one another.

It can be more economical to use prefabricated metal wall sections and roof trusses which have been fabricated in an efficient factory style setting elsewhere and delivered to the job site. Providing prefabricated wall sections and trusses can result in substantial cost savings by decreasing the amount of time and labor performed on the job site. Recognition of the possibility of such cost savings has led to production of wood framed walls (and trusses) using semi-automated machinery at remote sites, with the wooden wall sections or trusses being shipped to the building site. One such device is described in U.S. Pat. No. 4,876,787 for an apparatus and method for frame wall fabrication. The patent was issued to Ditty et al on Oct. 31, 1989. The Ditty et al apparatus fabricates frame walls from wooden end plates and studs, and includes registration of wooden members for end plates and for studs. An automatic nailer tacks the end plates and studs together one at a time until the desired wall length is achieved. A staking and anchoring mechanism presses the plates and studs together so as to rigidity the frame wall. The operations of the apparatus are controlled by a micro-processor controller which can be re-programmed for various types of walls.

Another process for fabricating walls is described in U.S. Pat. No. 3,851,384, which was issued to Kellner et al on Dec. 3, 1974. The Kellner et al device describes a process for fabricating walls from wood framing materials of the type normally used in constructing frame buildings. The process includes a series of sequentially actuated machine systems electrically interconnected for selecting and feeding components and for selectively assembling the components into walls having adjustably regulated dimensions including openings defining doors and windows. The wooden components are fed into the system and are selectively indexed in response to a series of machine control signals derived from a source of intelligence, such as a coded tape. The wooden components are then automatically nailed together as the wall unit is fed through the machine system.

R. F. Wright was issued U.S. Pat. No. 4,295,269 for a truss assembly apparatus on Oct. 20, 1981. Wright's apparatus includes an elongated table with a movable presser carriage for embedding fastener plates into precut wooden truss members positioned on the table. Clamping assemblies are mounted to the table for securing the truss members securely.

R. C. Wright was issued U.S. Pat. No. 3,897,620 on Aug. 5, 1975 for a method and means for making a wall section. This invention includes a substantially automatic assembly line type operation having a wall support with a carriage having a jig apparatus thereon movable through a plurality of machines for inserting wooden members in the jig apparatus, securing the members together, placing sheeting material on the members, and securing them to another machine for placing windows in the wall section.

A pressure actuated clamp for truss manufacturing equipment is described in U.S. Pat. No. 4,660,815, issued to Rosser on Apr. 28, 1987. The Rosser device includes a clamping apparatus for securing wooden chord and web members together for manufacturing wooden trusses. The clamping apparatus includes an inflatable conduit to force and elongated clamp into a closed position for securing the wooden members in place. The apparatus includes a jig table, with inflatable conduit, and a movable presser carriage for pressing metal toothed plates into the truss members.

Unfortunately, the same mass production machinery used for fabricating wooden stud frame walls and trusses is not well suited for metal framed walls and roof trusses. The wood frame wall fabricating assemblies previously mentioned all either shoot nails through the top and bottom plates and into the terminal ends of the studs or press nail plates into the joints of the wall, neither of which would work for metal structural frame members which are elongated and C shaped in cross section, and made of thin metal. Currently most building codes require metal studs to be joined to the metal top and bottom plates with metal holding screws placed two to each side of the wall or trusses, one screw to the top plate, one on the bottom plate, and this on each oppositely disposed side of the plates or wall section. This holding screw or fastener pattern is also normally applicable to window and door headers and sills, truss cords and webs, and cripple studs and the like. Once the first side holding screws are applied, holding screws must be applied to the second side, and this is a problem existing in the industry which is costing time and thus money. Often the application of the second side holding screws requires inverting the wall section or truss to affix the screws, since most of the time the walls and trusses are constructed laying down or flat on a surface for improved accuracy in layout, safety and generally greater ease in the process. Another problem existing in the building of metal framed walls and trusses is that the ends of the studs, webs and other members which are supposed to be tightly abutted against one another are not being consistently tightly abutted prior to the application of the holding screws, and this results in the very undesirable condition of the wall or truss not being even or straight, and also the fasteners being relied upon to attempt to support the vertical weight or other loading of the structure, as opposed to the members abutting tightly against one another wherein the screws generally simply prevent lateral displacement of the structural members relative to one another.

SUMMARY OF THE INVENTION

The present invention provides a large rotatable indexing and clamping platform for the assembly of metal frame walls and metal roof trusses for commercial and residential buildings. The platform is rectangular, and although not solid, it includes sufficient structural members to define a table-like top surface upon which studs, plates, rafters, cords, webs and the like may rest with the platform in a horizontally disposed position. The platform is sufficiently open to allow reaching through the back side of the platform with it in the inverted position to apply holding screws as desire, and this aspect will become fully appreciated with continued reading. Screws are described as the fasteners in this disclosure, however, if rivets or welds or adhesives or the like fasteners are used, this would still be considered within the scope of my invention.

The platform is rotatably suspended on each end with central axles to vertically movable carriages which are affixed to vertical end supports or super-structure. The carriages can be raised or lowered in unison to alter the height of the platform to achieve a good work height, or to provide sufficient ground clearance for rotating the platform 180 to 360 degrees or anywhere in between.

The platform includes index stops for proper lateral registration (placement) of metal studs such as on 24 inch centers, and powered spring-biased stud clamps for pressing laterally and holding the metal studs tightly against the indexing stops. One full lengthwise side or first side of the platform includes a rigid upward extending short side wall for abutment against with one end plate such as a top or bottom plate of a wall or truss, and the oppositely disposed lengthwise side straight across the platform includes a similar wall or second upward extending side wall for abutment against with the oppositely disposed plate of the wall or truss being constructed. The second side wall of the platform is moveable under power inward and outward of the lengthwise center axis of the platform for clamping and for allowing the building of different heights of walls and sizes of trusses.

For building a wall section, studs may be manually placed between two C channel plates (top and bottom wall plates) and extending perpendicular to the plates and resting on the top surface of the horizontally disposed platform. Once the two plates, i.e., top and bottom plate are in place with the studs in place between them, the indexing clamps are then activated to make sure the studs are laterally tight against the index stops. The second side wall of the platform is then powered and moved inward to tightly compress the stud terminal ends against the interior or interfacing surfaces of the top and bottom plates so that there are no gaps between the stud terminal ends and the plates. At this point the narrow side walls of the studs are inside the C channel of the plates and the side walls of the studs and plates are overlapping in an area of about 1⅝×1⅝ inches on each side of the wall at both the top and bottom of the wall section. Primarily due to the spring-biasing, the indexing clamps are not so strong as to prevent the studs from sliding lengthwise somewhat if needed to eliminate gaping under the pressure of the side wall clamp which I refer to as the press plate. Gaping is eliminated and the hold screws to be applied will not be relied upon to holding vertical loading, and the wall will be straight and even when completed. The platform, the indexing stops and upward intending side walls are also structured such that the wall sections are automatically squared to having 90 degree corners when this is what is desired in accordance with the building specifications.

Once all metal studs and plates are secured under clamping pressure, they can be affixed together with holding screws on the top or upward facing side. It is preferable for rate of production to have a worker on each side of the platform, i.e. one worker on the fixed side wall side of the platform, and one worker on the press plate side wall of the platform. The platform should be at a height allowing the workers applying the screws to easily and conveniently apply the screws using hand held screw guns or the like, and this would normally be with the top of the platform at about waist height.

When the upward facing side of the metal frame wall (or truss) has been affixed with the metal screws, the platform is raised (if needed), and rotated 180 degrees to expose the other or opposite side for attachment with metal screws. The clamping pressure of the press plate and stud clamps is sufficient to prevent the wall or truss section from falling to the ground when the platform is rotated and inverted. Once inverted and lowered to a good work height, the workers may apply the holding screws to the now upward facing surface of the wall section or truss. The platform may also be rotated to stand vertically or at a vertical angle when desired, such as to allow the workers to easily apply screws in the middle of the wall to far inward to otherwise reach, a situation which can occur with window sills and headers, and on trusses on occasion.

The stud clamps and index stops can be relocated or individually flipped downward out of the way such as for assembling roof trusses, or for door and window openings and the like. For registering and clamping truss members in the process of building a truss or a raked or sloped ceiling wall, elongated sections of angle iron or a like straight rigid member are manually clamped with C-clamps or the like to structural members of the platform, to form an angle or pattern equal to the required pitch of the roof truss or wall top plate, or to whatever the building plans specify. Metal rafters or plate members are then placed and abutted against the angle iron. The webs and/or other members of the truss or studs of the wall are then placed, and the horizontal or bottom cord or plate metal member is placed and aligned with the movable plate press of the platform, which presses the bottom cord or plate securely against the webs or studs, and the webs or studs against top cord (rafter) or plate. Since many trusses have rafter tails which extend beyond the bottom cord at an angle matching the roof pitch, the press plate of the platform is preferably created in separate short sections which can be used as several separate sections or as one unitary long section. In order to provide space for the extending rafter tails, the press plate sections in this or these areas of extending tails are disconnected from the powering mechanics and manually drawn outward out of the way. This leaves the section or sections of the press plate inward of the rafter tails for pressing the truss bottom cord against the webs which in turn presses the top ends of the webs against the rafters which are stabilized by the C-clamped angle iron. After clamping of the truss, screws are applied to the upward facing surface, followed by rotating the platform 180 degrees to exposed the other side for application of the screws.

The platform, which can be built to many different lengths, and I prefer it at about forty feet, is preferably created in sections which can be disassembled and easily transported. The ability of the apparatus to be transported allows it to be used on building sites if necessary, such as large apartment complexes or housing subdivisions. The present platform may be mounted on a trailer or railroad flatbed car for moving from one area of use to another. The platform may be set-up over a narrow central pit or below nominal grade channel to eliminate the need to be raised on the carriages to provide ground clearance for rotation.

This invention is particulary well suited for mass assembly of metal frame walls of similar dimensions, such as wall units for multiple tract homes or apartment complexes having the same or similar floor plans. For installing door and window trimmers and headers, angle iron or the like may be clamped in the correct location to the platform much as described above for truss rafters or top cords.

Other objects and advantages of the present invention will become apparent by examining the remaining specification with comparison of the accompanying drawings.

DESCRIPTION OF THE PREFERRED EMBODIMENT

Figure 1:
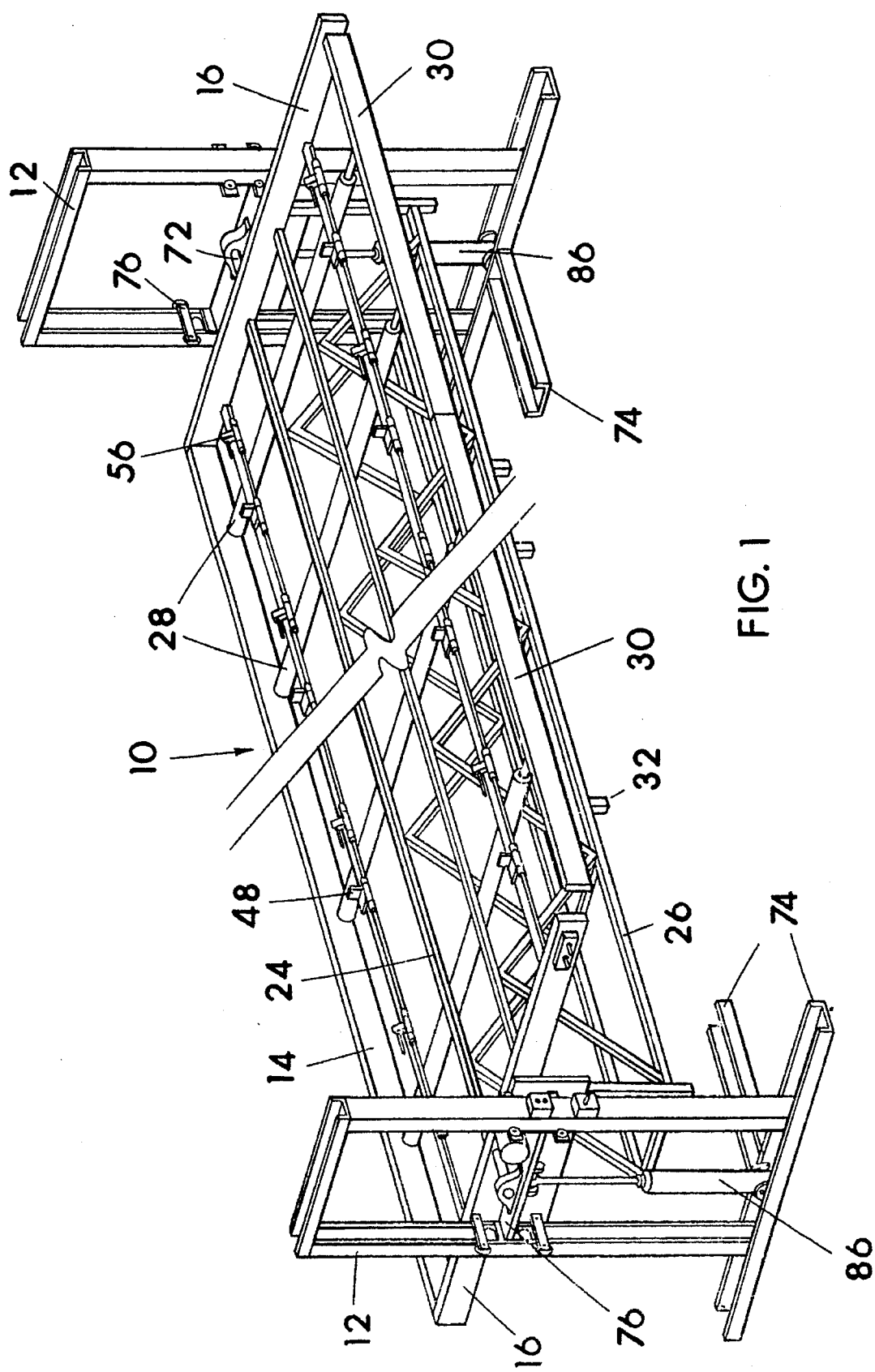
FIG. 1 is a top perspective view of a structural embodiment exemplifying the present invention.
Figure 2:
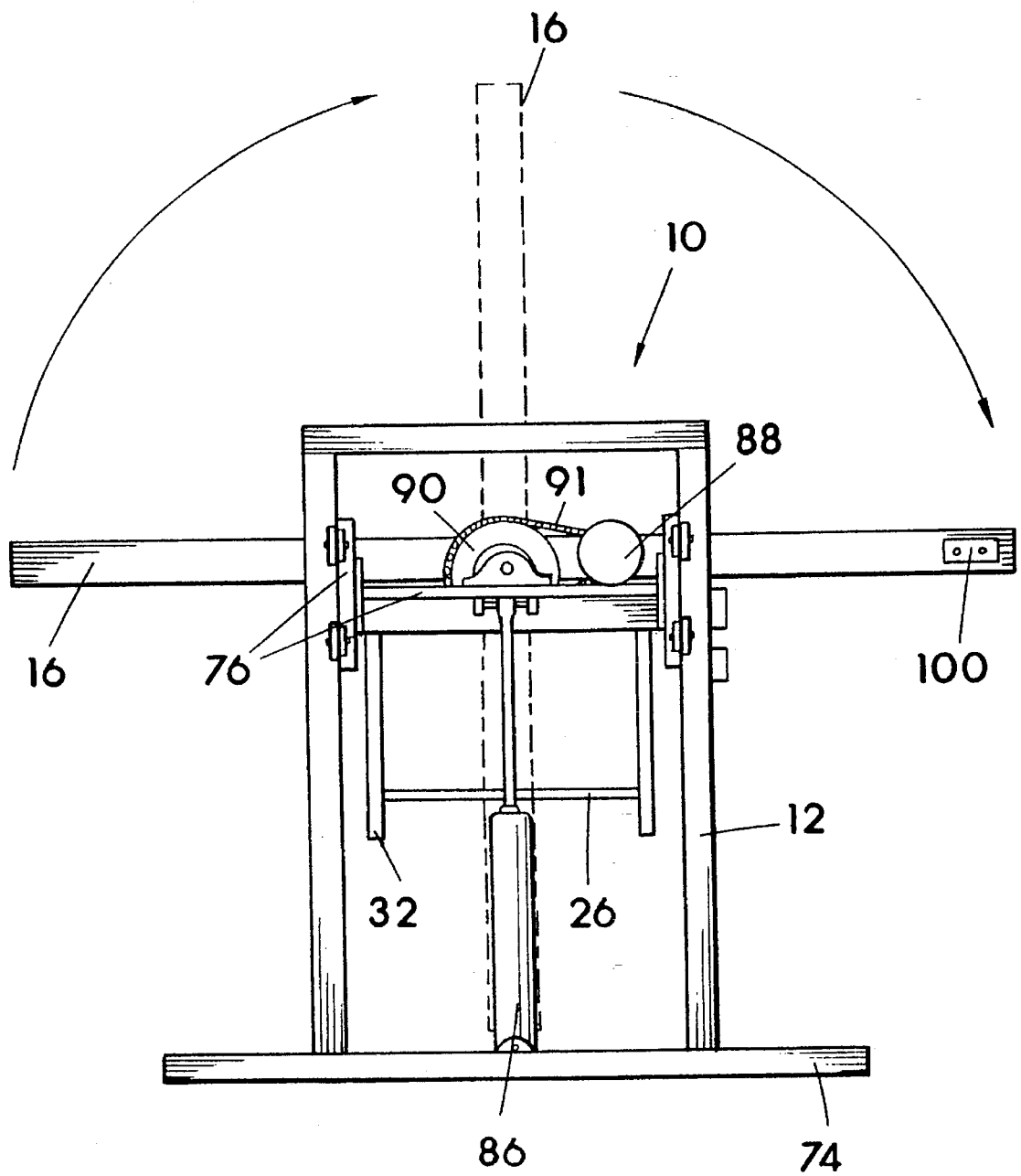
FIG. 2 is an right end elevational view thereof illustrating the rotating platform.
Figure 3:
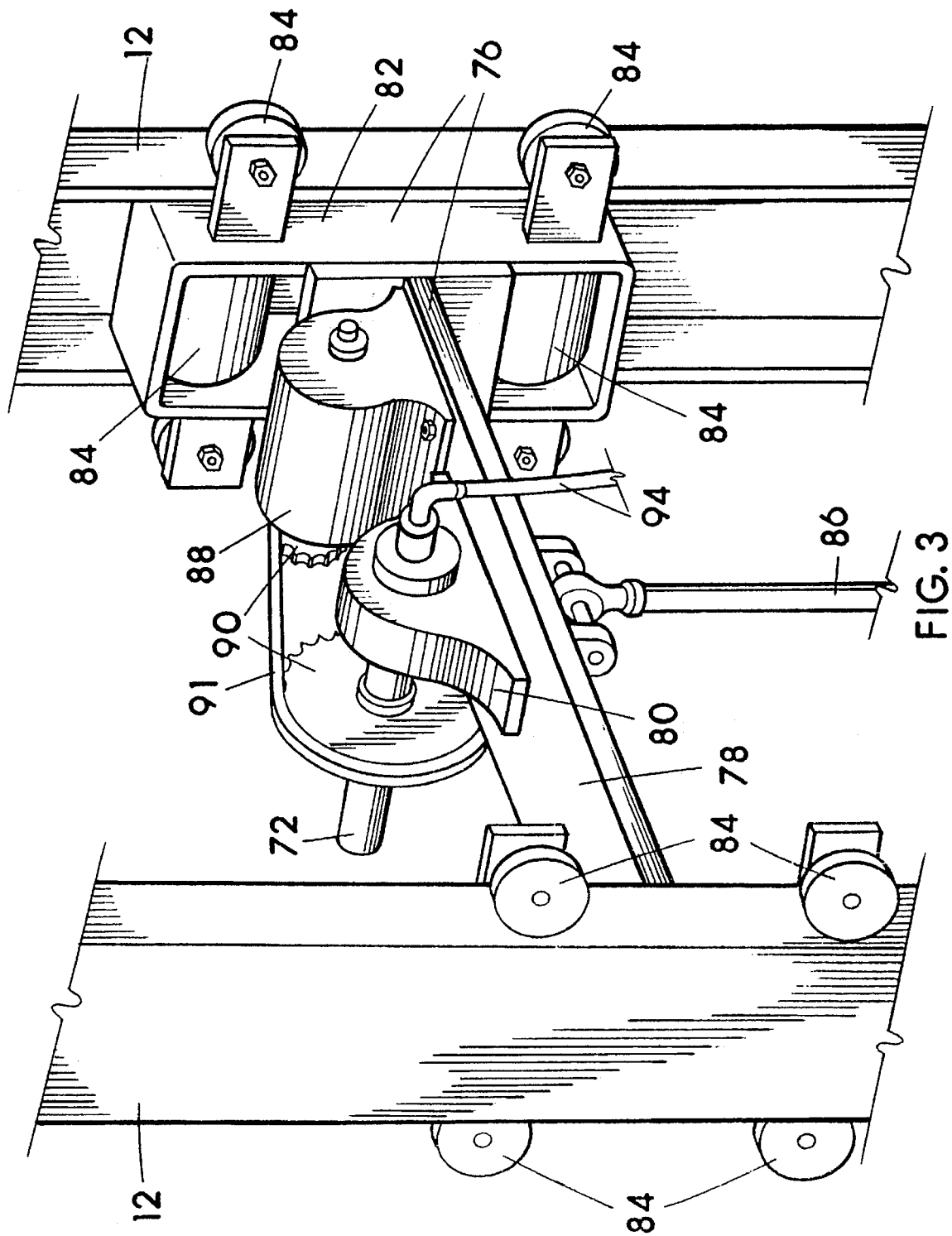
FIG. 3 is a perspective view of one of the endward carriages attached to the vertical supports.

The following detailed description is of a best mode for carrying out the invention, and although there are clearly many changes which could be made to that which is specifically shown and described in the appended drawings, for the sake of briefness of this disclosure, all of these changes which fall within the scope of the present invention have not herein been detailed, but will be apparent to those skilled in the art.

The present invention includes the elongated generally flat rectangular platform 10, which is rotatably supported on each end by vertical metal end supports 12. Platform 10 is preferably made of many welded or otherwise affixed together metal bars, tubes and plates. The width of platform 10 being at least eight feet accommodates the assemblage of wall heights of at least eight feet, with the length of platform 10 extending up to forty feet and being at least thirty feet in length. Wall sections longer than forty feet would be too difficult to transport and handle for many applications, and if longer wall sections are needed then two or more shorter sections can be joined together at the building site.

Platform 10 includes an elongated longitudinal side plate 14 and two transverse end plates 16 which are approximately six inches in upward extension to provide an abutting surface for the metal members, which can include metal studs 18, metal top and bottom end plates 20, and metal truss 22 members. Platform 10 also includes four longitudinal rectangular frame members 24 which are endwardly affixed to each end plate 16. Frame members 24 add rigidity to platform 10 and provide a support surface for studs 18 and trusses 22. Affixed to the underside of two central frame members 24, and running the length thereof, is an elongated rectangular stiffening bridge 26 which adds rigidity to platform 10 and also serves as a support stand for resting platform 10 on the surface of the ground. Stiffening bridge 26 includes a rectangular frame with various cross bracing which provides a strong yet lightweight support for platform 10. There are several support legs 32 located on the bottom edge of stiffening bridge 26 for elevating bridge 26 off the ground.

Affixed to the bottom surface of frame members 24 at right angles thereto, are tubular telescopic shafts 28, spaced approximately four to six feet apart. Telescopic shafts 28 include an exterior tubular hollow housing, which is affixed stationary to the bottom surface of frame members 24, and an interior smaller cylindrical shaft which is extendable from the larger housing. The terminal end of the extendable interior telescopic shaft 28 is affixed, at a right angle, to plate press 30. Plate press 30 includes an elongated rectangular divided panel similar in size to side plate 14, with each divided segment attached to at least two interior telescopic shafts 28 for support. Press plate 30 is positioned parallel to side plate 14 and functions as a clamping member for securing the metal bottom end plates 20 against the metal top end plates 20 with the metal studs 18 engaged in between. The purpose of the divided segments of plate press 30 will be further explained later. Plate press 30 is actuated by linkage rod 36 which lies beneath and parallel to telescopic shaft 28. Linkage rod 36 is connected to the bottom surface of the small interior telescopic shaft 28 by a downward depending metal plate. The metal plate is removably affixed with removable pin 35 to threaded shaft 38. Threaded shaft 38 is threadably engaged within linkage rod 36 by a threaded nut 40 affixed to the distal end of linkage rod 36. This arrangement allows threaded shaft 38 to be extended outward from linkage rod 36 by first removing pin 35 from engagement with the metal plate affixed to the interior telescopic shaft 28 and threaded shaft 38. Then threaded shaft 38 is manually turned until it extends outward the desired distance. The interior telescopic shaft 28 is then pulled out from the exterior telescopic shaft 28 until it can be reconnected to the threaded shaft 38. The extension of threaded shaft 38 extends plate press 30 outward for accommodating studs 18 longer than eight feet, or for accommodating trusses 22, which will be further explained later. Linkage rod 36 is pivotally affixed on the opposite end to one corner of a triangular directional change linkage assembly 42. Directional change linkage assembly 42 is centrally pivotally affixed to a bracket connected to frame member 24 and the outer telescopic shaft 28. The remaining corner of directional change linkage assembly 42 is pivotally affixed to an elongated shaft 44 which runs the central length of platform 10, parallel to frame members 24, yet at a right angle to linkage rod 36. The right end of shaft 44 is affixed to a linear extendable actuator or ram 46 which is connected to an extension of the right end plate 16. Ram 46 can be pneumatic, electric or hydraulic. One single shaft 44 actuates all plate presses 30, which may vary in number depending on the length of platform 10.

Platform 10 also provides registration or indexing for aligning and spacing metal studs 18 properly, which, for most building codes, is on twenty-four inch centers. These include index stops 48, shown in FIG. 7, which are small right angled metal plates with the vertical portion of the plate used to abut studs 18 against. The horizontal position of the index stop 48 is affixed to a hollow metal sleeve 50 which is rotatably affixed to an elongated shaft 52. Sleeve 50 is retained in position on shaft 52 with the use of two guide sleeves 54 which are welded on either side of the sleeve 50 to frame member 24. Therefore, when index stop 48 is in the in-use position, the horizontal plate lies on top of frame member 24 and the vertical plate functions as a stop for stud 18. When in the non-use position, the index stop 48 can be pivoted over to the side where the vertical plate is out of the way.

Figure 7:
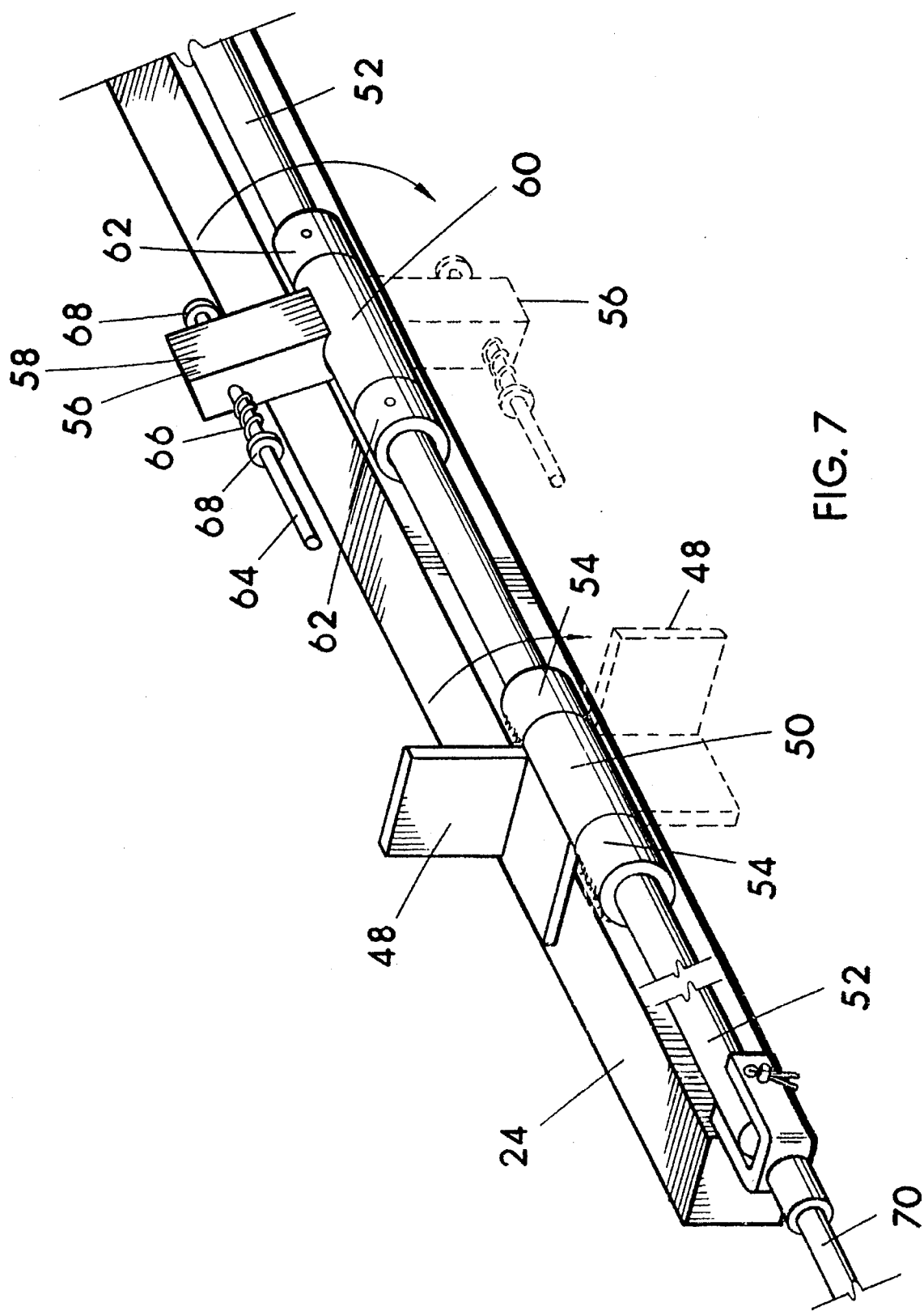
FIG. 7 is a top perspective view of one stud clamping assembly with mating index stop. The broken lines show the flipped downward out of the way position of the clamp and index stop.
Figure 8:
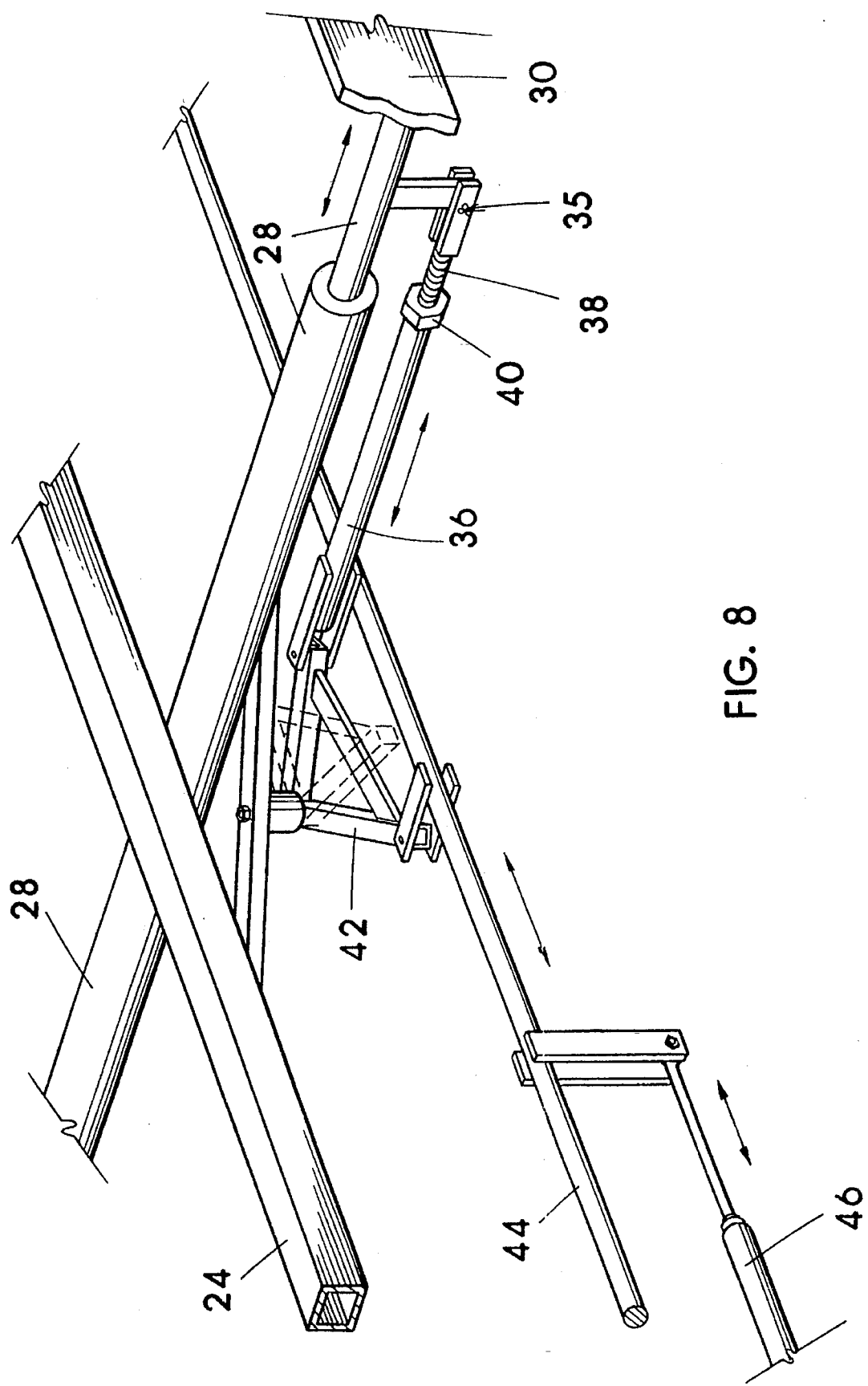
FIG. 8 is a top perspective view of one directional change linkage assembly which actuates the press plate into inward or outward movement.

Stud clamp 56, also shown in FIG. 7, is used in conjunction with index stop 48 to hold stud 18 tightly in position. Stud clamp 56 includes a short rectangular extended arm 58 which is affixed at a right angle to the exterior of pivotal sleeve 60. Pivotal sleeve 60 is also pivotally affixed to shaft 52. Pivotal sleeve 60 is maintained in position along shaft 52 with the use of two set screw collars 62, one affixed adjacent each end of sleeve 60. Set screw collars 62 can slide along shaft 52, unlike guide sleeves 54, when not secured in place with the set screws, therefore the distance between stud clamp 56 and index stop 48 can be adjusted. Stud clamp 56 also includes a horizontal push rod 64 which is movably affixed to the upper or distal end of extending arm 58, extending towards index stop 48. A compression spring 66 is engaged over push rod 64 and retained by an annular stop 68 which is welded to push rod 64. A second stop 68 is welded to the back end of push rod 64 which extends through extending arm 58. Stops 68 prevent push rod 64 from being removed from extending arm 58 and provide a surface against which compression spring 66 can press. Compression spring 66 allows a degree of adjustability when push rod 64 engages stud 18, and also provides constant tension thereto. Since stud clamp 56 is pivotally affixed to shaft 52, when in the upward or in use position extending arm 58 has been structured to lean at an angle over frame member 24. This helps prevent stud clamp 56 from accidentally falling over into the non use position. There is one stud clamp 56 for every index stop 48 and there are two index stops 48 for every stud 18; one adjacent each end. Therefore, there are two shafts 52 with varying numbers of sets of index stops 48 and stud clamps 56, depending on the length of platform 10. Preferably studs 18 are placed at twenty-four inch centers, which would therefore place index stops 48 and stud clamps 56 at approximately the same distances from one another. When index stops 48 and stud clamps 56 are not required, such as when trusses 22 are being assembled, they can be manually rotated into the non-use position.

Shaft 52 is affixed to frame member 24 by guide sleeves 50 which are welded to frame member 24, however shaft 52 still has the capability of a certain degree of lineal movement. While index stops 48 are retained in lineal position by the affixed guide sleeves 54, stud clamps 56 move longitudinally with shaft 52 since set screw collars 62 are not welded to frame member 24. All stud clamps 56 on both separate shafts 52, are actuated at the same time by lineal extension or retraction of the two shafts 52 with the use of two rams 70, which are both activated simultaneously with one control 100. Rams 70 are also affixed to the extension of the right end plate 16.

Platform 10 is rotatably connected on each end to vertical end supports 12 by horizontal axles 72. Vertical end supports 12 include two vertical members of channel iron, approximately six feet in height, having a cross member at the top and T-shaped stabilizing feet 74 on the bottom, which are also made of channel iron. Feet 74 may be bolted to the floor. Carriage 76 serves as a support for axle 72 on each vertical end support 12 and is movably suspended between the two vertical members of the vertical end supports 12. The carriage 76 includes a horizontal cross member 78 which supports bearing 80 into which axle 72 is engaged, and two vertical guides 82, one affixed to each end of cross member 78. The vertical guides 82 are structured of a small rectangular frame sized for riding within the interior channel of the vertical members of the end supports 12. The vertical guides 82 are affixed with three sets of rollers 84; two sets to the outside of the channel and one set within, which help guide the carriage 76 smoothly. Carriage 76 is raised or lowered within the vertical channels of the end supports 12 with ram 86. Ram 86 is positioned directly beneath carriage cross member 78 and is affixed to feet 74.

Power to rotate platform 10 is provided by electric motor 88 which is located on the top surface of cross member 78 adjacent bearing 80. Chain 91 connects to sprocket 90 around axle 72 and sprocket 90 on motor 88.

Figure 4:
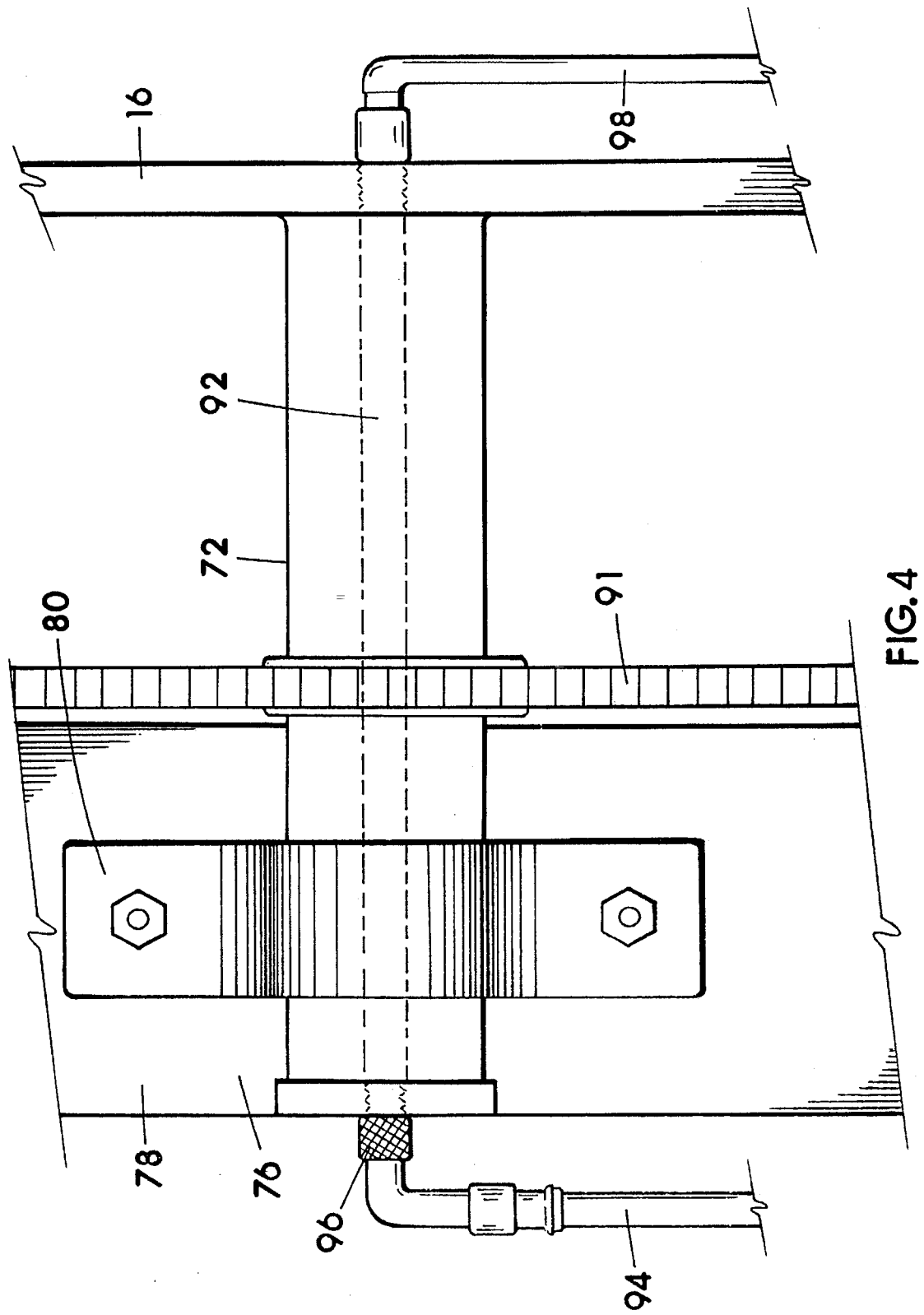
FIG. 4 is a top plan view of a section of carriage showing an axle supporting the platform and power feed connection.
Figure 5:
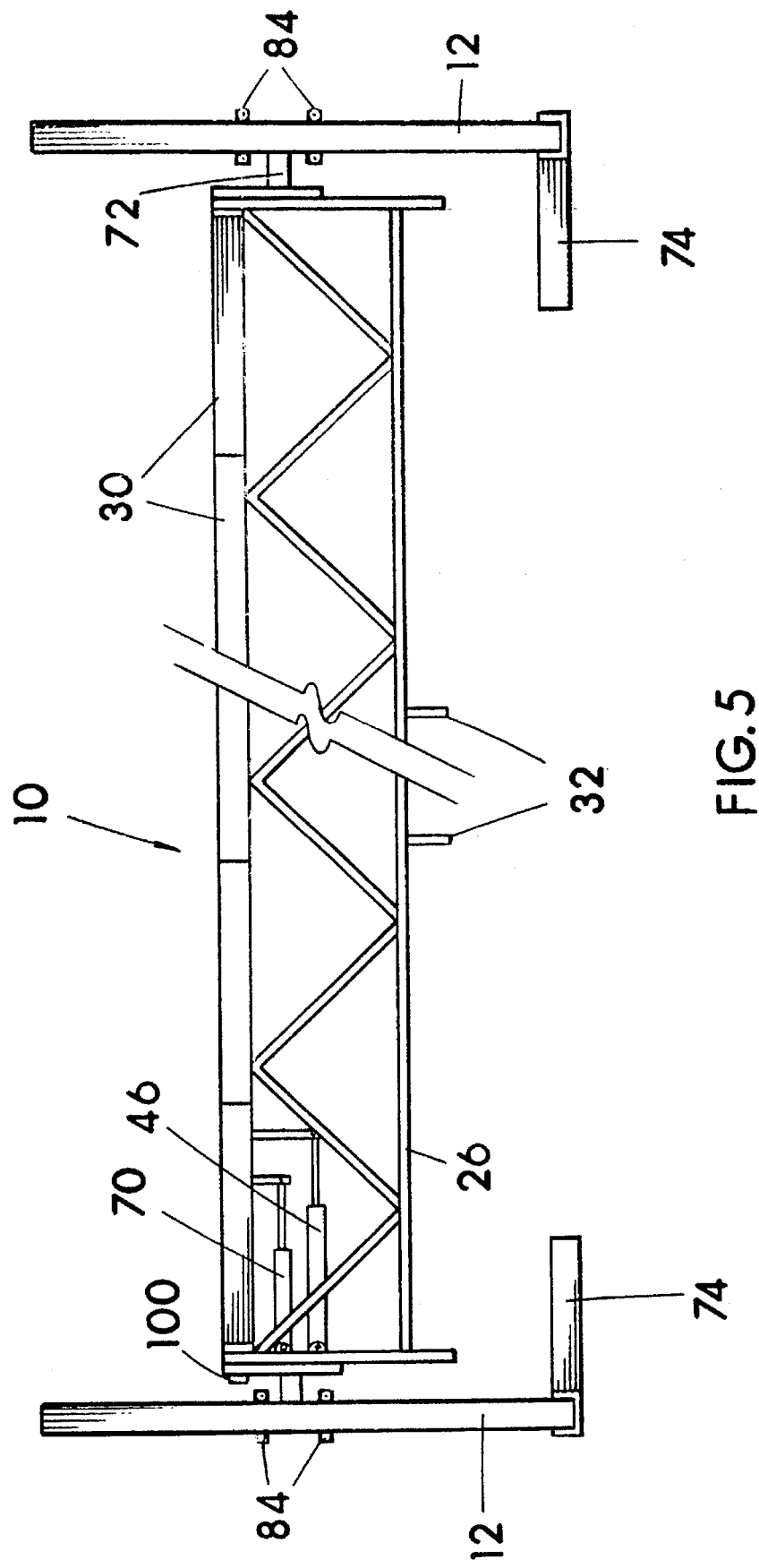
FIG. 5 is a front side elevational view of the embodiment of FIG. 1.

The power lines which operate ram 46 and rams 70 are directed through the hollow central bore 92 of the right axle 72, as shown in FIG. 4. A power feed 94 is connected to the central bore 92 by a rotating connection 96 which allows the bore 92 or axle 72 to rotate while power feed 94 remains stationary. The opposite end of bore 92 exits end plate 16 and is connected with a regular coupler and power line 98, which is directed to ram 46 and rams 70. Controls 100 for ram 46 and rams 70 which operate plate press 30 and stud clamps 56 are located on the end of the right end plate 16, as shown in FIG. 1. The controls 100 for ram 86 which rotates and raises platform 10 up or down are located on the side of vertical end support 12, also shown in FIG. 1.

Figure 9:
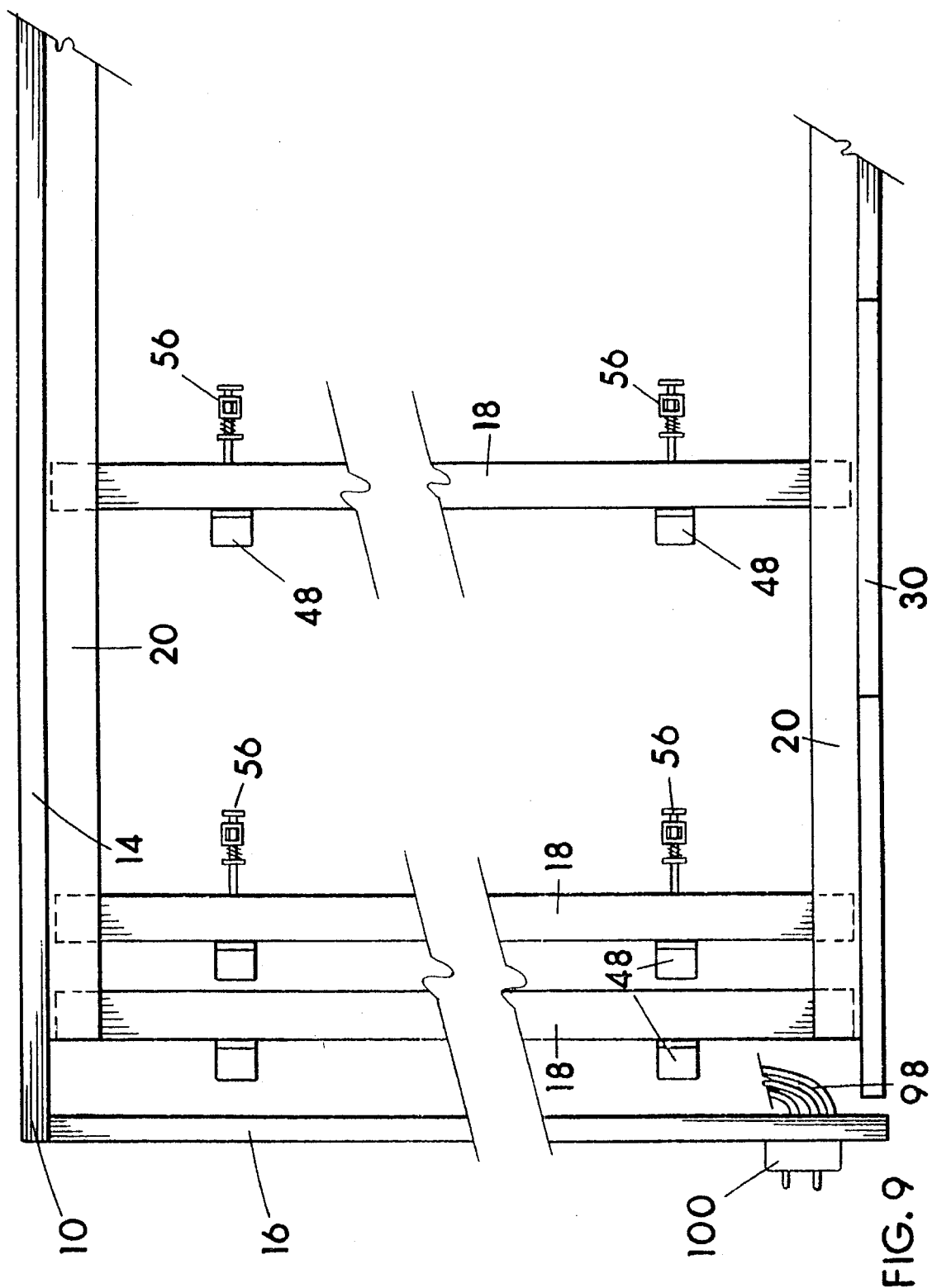
FIG. 9 is a partial top plan view of the platform with several metal studs shown clamped in position against top and bottom end plates.

To assemble a wall section, the individual precut metal studs 18 and end plates 20 are manually arranged in the proper positions on platform 10, as shown in FIG. 9. Studs 18 will be positioned vertically or transverse on platform 10, while top end plates 20 will be positioned parallel to and abutting side plate 14, and bottom end plates 20 will be loosely positioned adjacent or abutting plate press 30. Once studs 18 and end plates 20 are loosely positioned, stud clamps 56 are activated which clamps against and retains studs 18 and prevents transverse movement on platform 10. Then plate press 30 is actuated which draws bottom end plates 20 upward against the bottom ends of studs 18 and forces the upper ends of studs 18 against the interior of top end plates 20. The ends of studs 18 will be positioned within the interior channels of the top and bottom end plates 20 and when plate press 30 has finished its compression, there will be no remaining gaps between the ends of the studs 18 and the end plates 20. Once the wall section is secured, workmen can apply metal screws to the ends of the studs 18 where they join the end plates 20, preferably two to each site on this side of the wall. Then, platform 10 is raised, lifting stiffening bridge 26 up from the floor, and platform 10 is rotated to expose the other side of the wall assembly. Once inverted, platform 10 allows sufficient room on either side of stiffening bridge 26 to apply screws to the abutting ends of studs 18 on the reverse side of the stud frame wall assembly. It is noted that the placement of studs 18 and end plates 20 are arranged so that there is no interference with any structure of platform 10 for applying screws, even when platform 10 is reversed. Steel strapping may also be applied for strengthening the wall unit prior to removal from platform 10. Platform 10 is then rotated to a relatively vertical position where all clamping systems are released and the assembled stud frame wall can be removed from platform 10.

Figure 10:
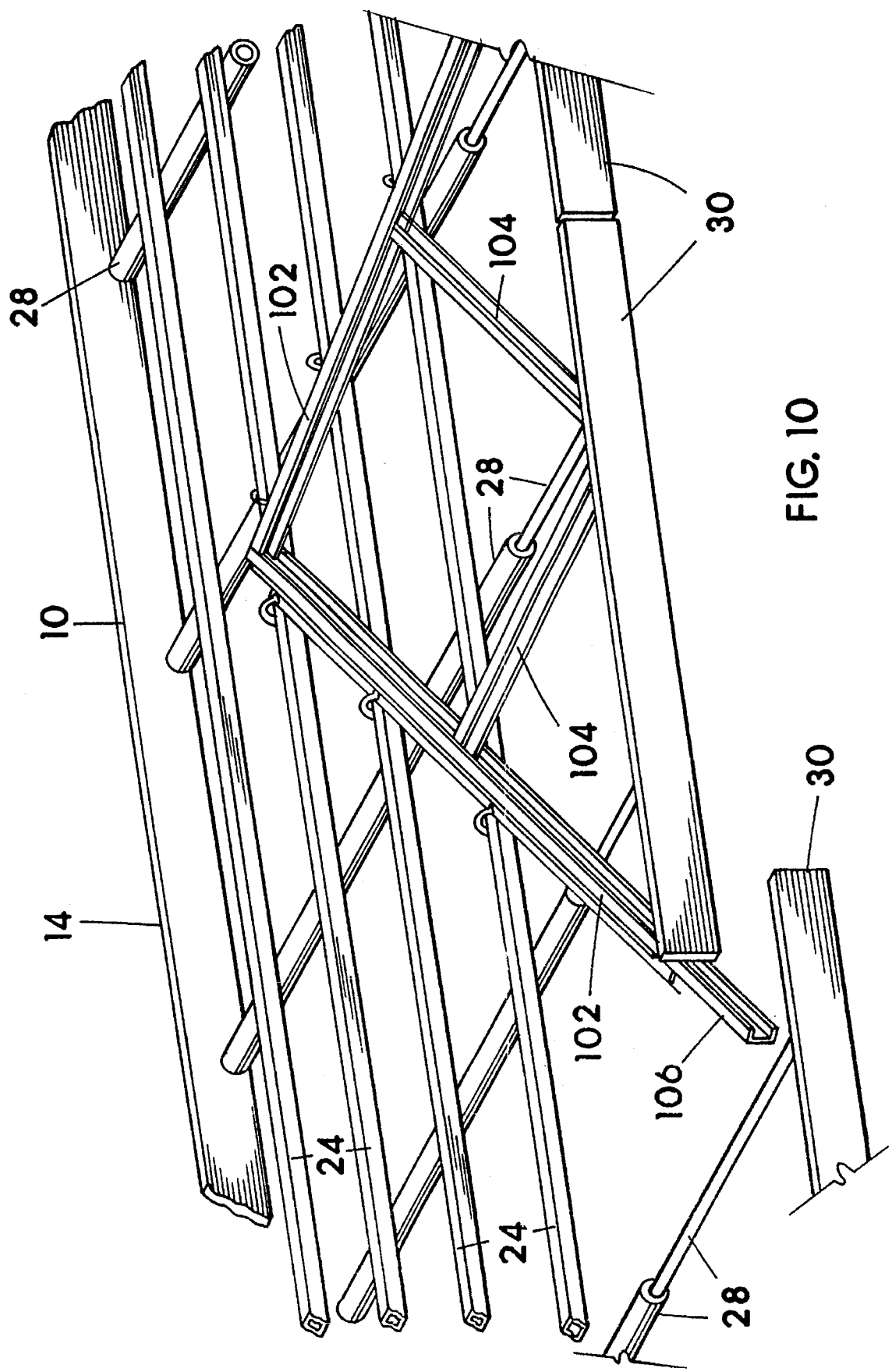
FIG. 10 is a top perspective view of a portion of the platform in use clamping a truss. The left end of the press plate is shown outwardly drawn to allow room for the rafter tail to extend below the truss bottom cord.

Platform 10 can also be used for assembling roof trusses 22, however index stops 48 and stud clamps 56 are not used in this procedure since trusses 22 generally have variably angled top cords 102, which represent the roof line of the future building. Therefore index stops 48 and stud clamps 56 are rotated downward to eliminate any upward projections above frame members 24. Angle iron braces are then used for stops for top cords 102 of trusses 22, as shown in FIG. 10, and they must be manually positioned and secured with C-clamps for each different type of truss 22. Once the angle iron brace is in place, top cords 102 are abutted against the back side thereof and the interior webs 104 of truss 22 are placed in proper position. The bottom cord is then placed adjacent plate press 30. Most trusses 22 have rafter tails 106 which are extensions of the angled top cords 102 past the lower horizontal bottom cord of the truss 22. The divisions in the plate press 30 are structured for use when assembling trusses 22 by extending out a section of the plate press 30 past the adjacent section of plate press 30 to allow room for the extending rafter tail 106, as shown in FIG. 10. Then plate press 30 is clamped against the bottom cord which secures all the members in position. Screws can then be applied to the exposed side of the truss 22, with the opposite side exposed by rotating platform 10.

To accommodate window and door openings in the metal frame wall unit manual clamps must be applied at specified locations to support clamping edges or plates against which headers for the window and door openings can abut. Since this manual set-up of the clamps is time consuming, it is preferred that multiple sections of the same wall unit are assembled at the same time.

Figure 6:
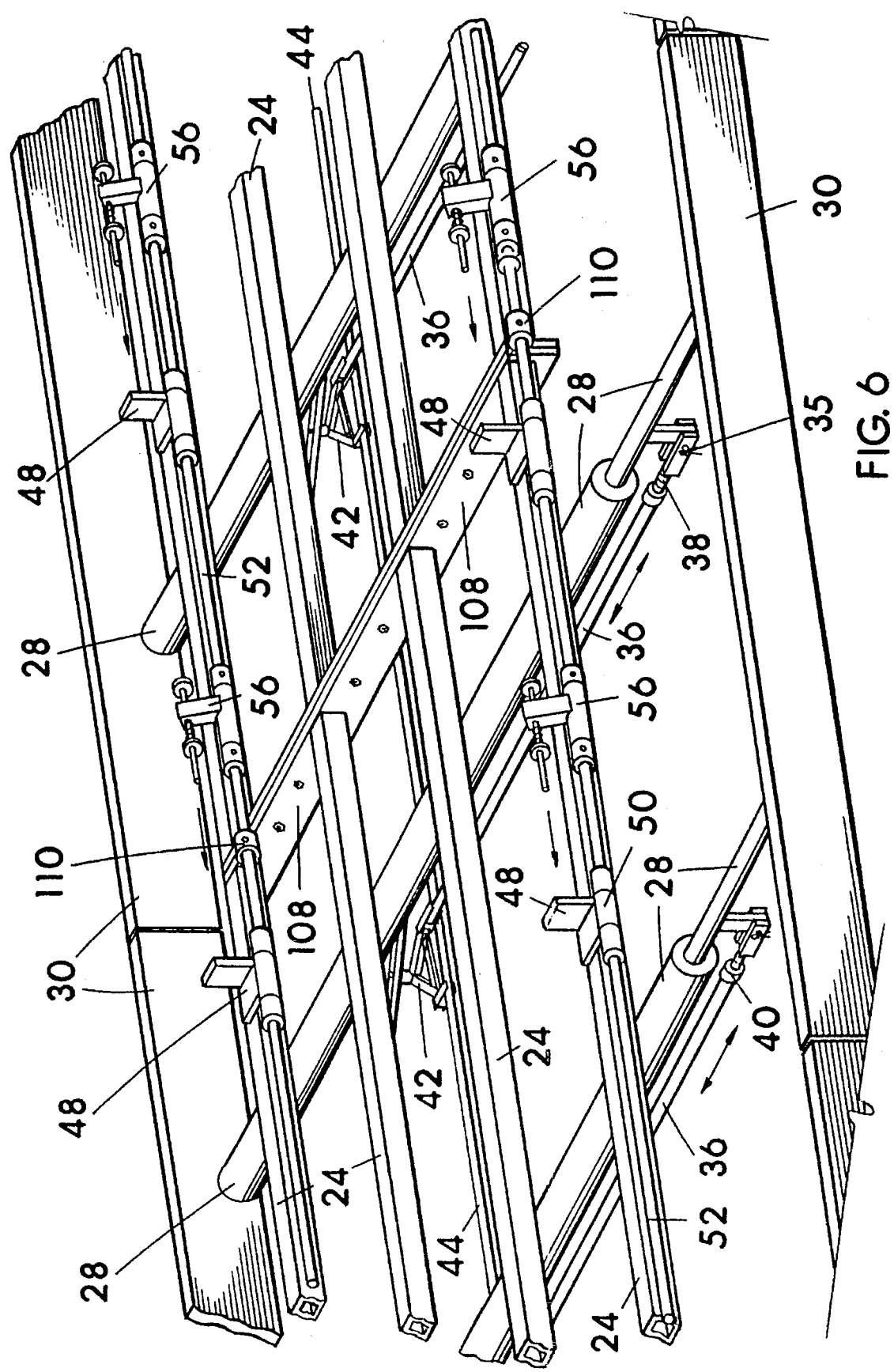
FIG. 6 is a partial top perspective view of the platform.

A significant advantage of this apparatus is that it can be disassembled into smaller, relatively easily transported members. Therefore, platform 10 is comprised of segments, preferably no longer than ten feet in length, which are bolted together to form one long forty foot platform 10. Where platform sections are to be affixed there has been added attachment plates 108. Attachment plates 108 are flat rectangular plates which are affixed transversely to the separated ends of frame members 24 and provide a surface which can be bolted together, best shown in FIG. 6. Stiffening bridge 26 is also segmented and utilizes smaller bolt on plates for securing the sections together. Shaft 44 is also severed in the same area as the attachment plates 108, and they are joined with couplers 110. Both shafts 52 also are severed and joined by couplers 110 in the same area.

Although I have very specifically described the preferred structures and use of the invention, it should be understood that some changes in the specific structures described and shown in my drawings may clearly be made without departing from the true scope of the invention in accordance with the appended claims.

What I claim as my invention:

1. A rotatable work platform for indexing and clamping building frame members during construction of a building frame section, comprising;

the platform structured of a plurality of spaced members defining a table-like surface at least 8 feet in width, said platform including axles connected to support means on each of two oppositely disposed ends of the platform, indexing means attached to said platform for indexing building frame members in predetermined locations on said platform, first clamping means affixed to said platform for securing building frame members against said indexing means, second clamping means affixed to said platform for pressing building frame members inward toward a lengthwise center axis of said platform, powering means connected to said second clamping means for powering said second clamping means inward and outward toward and away from the lengthwise center axis of said platform, rotational powering means connected to at least one of the axles for rotating said platform from a first horizontal position to an inverted horizontal position, said support means including vertically movable carriage means supporting said axles, and powering means for raising and lowering said carriage means for elevationally raising and lowering said platform, whereby said platform can be raised to provide grade clearance for rotating said platform, and then lowered to position said platform at a horizontal suitable work-height.

2. A rotatable work platform according to claim 1 wherein said indexing means and said first clamping means are rotatably positionable between an in-use position for use against building frame members, and a lower non-use out-of-the-way position.

3. A rotatable work platform according to claim 2 wherein said platform in divided into separable bolt-together segments along its length, whereby said platform can be disassembled into multiple short lengths for ease in transporting the platform.

4. A rotatable work platform according to claim 3 wherein said platform is at least thirty feet in length.

* * * * *